United States Patent
Lee et al.

(10) Patent No.: US 8,170,411 B2
(45) Date of Patent: May 1, 2012

(54) SYSTEM AND METHOD FOR INPUTTING POSITION INFORMATION IN CAPTURED IMAGE

(75) Inventors: Jong-tae Lee, Seongnam-si (KR); Jae-ho Han, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 249 days.

(21) Appl. No.: 12/074,807

(22) Filed: Mar. 6, 2008

(65) Prior Publication Data

US 2008/0317456 A1  Dec. 25, 2008

(30) Foreign Application Priority Data

Jun. 25, 2007  (KR) .................. 10-2007-0062491

(51) Int. Cl.
*G03B 17/24* (2006.01)
(52) U.S. Cl. .................. 396/310; 348/333.02
(58) Field of Classification Search ............. 348/333.02; 396/321, 310
See application file for complete search history.

(56) References Cited

U.S. PATENT DOCUMENTS

| | | | | |
|---|---|---|---|---|
| 5,506,644 | A * | 4/1996 | Suzuki et al. | 396/319 |
| 5,768,640 | A * | 6/1998 | Takahashi et al. | 396/310 |
| 2002/0001032 | A1 * | 1/2002 | Ohki | 348/207 |
| 2002/0191087 | A1 * | 12/2002 | Hashimoto et al. | 348/231.3 |
| 2003/0053664 | A1 | 3/2003 | Pavlidis et al. | |
| 2003/0071908 | A1 | 4/2003 | Sannoh et al. | |
| 2005/0108261 | A1 * | 5/2005 | Glassy et al. | 707/100 |
| 2006/0007315 | A1 * | 1/2006 | Singh | 348/207.99 |
| 2007/0182627 | A1 * | 8/2007 | Ueno et al. | 342/357.06 |
| 2007/0200862 | A1 * | 8/2007 | Uchiyama et al. | 345/564 |

FOREIGN PATENT DOCUMENTS

| | | |
|---|---|---|
| CN | 1450360 A | 10/2003 |
| CN | 1585957 A | 2/2005 |
| EP | 447978 A2 * | 9/1991 |
| EP | 1 795 995 A2 | 6/2007 |
| JP | 2004-357343 A | 12/2004 |
| JP | 2006-279110 A | 10/2006 |

OTHER PUBLICATIONS

Office Action established for CN200810094835.2.
Office Action established for CN 200810144710.6 (Aug. 10, 2011).

\* cited by examiner

*Primary Examiner* — Christ Mahoney
*Assistant Examiner* — Fang-Chi Chang
(74) *Attorney, Agent, or Firm* — Drinker Biddle & Reath LLP

(57) ABSTRACT

A system and method for connecting a global positioning system (GPS) device with a digital image processing device and inputting position information into an image file captured by the digital image processing device. A system and method for inputting position information into a captured image employ a digital image processing device which generates an image file by capturing an image, and stores the image file, a GPS device which receives position information from a GPS satellite at regular time intervals; when the digital image processing device is connected with the GPS device, a GPS information storage unit which receives position information from the GPS device and stores the position information, and a GPS information input control unit which inputs position information excluding a timestamp, into an image file.

32 Claims, 6 Drawing Sheets

SYSTEM AND METHOD FOR INPUTTING POSITION INFORMATION IN CAPTURED IMAGE

CROSS-REFERENCE TO RELATED PATENT APPLICATION

This application claims the benefit of Korean Patent Application No. 10-2007-0062491, filed on Jun. 25, 2007, in the Korean Intellectual Property Office, the disclosure of which is incorporated herein in its entirety by reference.

BACKGROUND OF THE INVENTION

1. Field of the Invention

The present invention relates to a system and method for connecting a Global Positioning System (GPS) with a digital image processing device, and inputting position information into an image file captured by the digital image processing device.

2. Description of the Related Art

Various kinds of digital image processing devices exist, such as a digital camera, a portable phone having a camcorder and camera, an electronic scheduler having a camera installed therein, a Personal Data Assistant (PDA), or the like, that are capable of capturing images and storing the digitized images. These digital image processing devices are portable and can be carried while traveling or for example, mountain climbing, so as to capture images of various scenes and to electrically record the captured images. However, these digital image processing devices only provide functions for capturing, storing, and scanning photographs, but cannot store information pertaining to locations where the photographs were taken or other specific information pertaining to those locations.

In order to solve the above-described problems, a Global Positioning System (GPS) can be installed in a digital image processing device, thereby enabling storage of information on places where photographs were taken or specific information on the places. For example, a method of transmitting communication information between a GPS receiver and an image capture device is disclosed in Japanese Patent Laid-Open Publication No. 2006-279110. The GPS receiver has a wireless communication function and a GPS function, and the image capture device has a wireless communication function capable of wirelessly communicating with the GPS receiver, and a capturing function. The GPS receiver and the image capture device can perform point-to-point wireless communication, and exchange information via serial communication. After the image capture device pre-registers a connection and connection point of the GPS, when the image capture device is started, the point-to-point wireless communication connection between the GPS receiver and the image capture device is automatically performed. After the point-to-point wireless communication is performed, GPS information (position information) is transmitted from the GPS receiver to the image capture device, and then the image capture device adds the GPS information to a captured image.

In the above-described conventional technology, when the GPS receiver and the image capture device perform the wireless communication, the image capture device and the GPS receiver perform real-time communication so that the image capture device receives the GPS information. Therefore, if the image capture device stays in a location in which the image capture device has received the GPS information and becomes incapable of receiving new GPS information, the image capture device fails to add the GPS information to a captured image.

SUMMARY OF THE INVENTION

The present invention provides a system and method for inputting position information into a captured image and an operation method thereof. The system and method are capable of real-time storage of position information received by a digital image processing device from a Global Positioning System (GPS) device, and whenever needed, inputs the position information in a captured or reproduced image.

The present invention also provides a system and method for inputting position information into a captured image. The system and method are capable of real-time storage of position information received by a GPS device from a GPS, and when requested by a digital image processing device, transmit the position information to the digital image processing device, so that the position information can be recorded on a captured image.

Another embodiment of the present invention provides a system and method for inputting position information into a captured image. The system and method employ: a digital image processing device for generating an image file by capturing an image and storing the image file, and a GPS device for receiving position information from a GPS satellite at regular time intervals. When the digital image processing device is coupled to the GPS device, the digital image processing device includes a GPS information storage unit for receiving position information from the GPS device and storing the position information, and a GPS information input control unit for inputting position information excluding a timestamp, into the image file.

Still another embodiment of the present invention provides a system and method for inputting position information into a captured image, employing a digital image processing device for generating an image file by capturing an image and storing an image file and a GPS device for receiving position information from a GPS satellite at regular time intervals. The system and method perform operations including: (a) determining whether the GPS device is connected to the digital image processing device, (b) when the digital image processing device is connected to the GPS device, operating the digital image processing device to receive position information from the GPS device and store the position information, and (c) operating the digital image processing device to input the position information excluding a timestamp into the image file.

A further embodiment of the present invention provides a system and method for inputting position information into a captured image. The system and method employ a digital image processing device for generating an image file by capturing an image and storing the image file, and a GPS device for receiving position information from a GPS satellite at regular time intervals. The GPS device includes a GPS information storage unit receiving position information from the GPS satellite and storing the position information. The digital image processing device requests the GPS device for position information, receives the position information, and inputs position information excluding a timestamp, into the image file.

Still another embodiment of the present invention provides a system and method for inputting position information into a captured image. The system and method employ a digital image processing device generating an image file by capturing an image and storing the image file and a GPS device receiving position information from a GPS satellite at regular time intervals. The system and method perform operations including: (a) determining whether the digital image processing device is connected to the GPS device by the digital image processing device, (b) when the digital image processing device is connected to the GPS device, operating the GPS device to receive position information from the GPS satellite and store the position information; and (c) according to a request, operating the digital image processing device to receive position information from the GPS device and the input position information excluding a timestamp into the image file.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described more fully with reference to the accompanying drawings.

Figure 1:
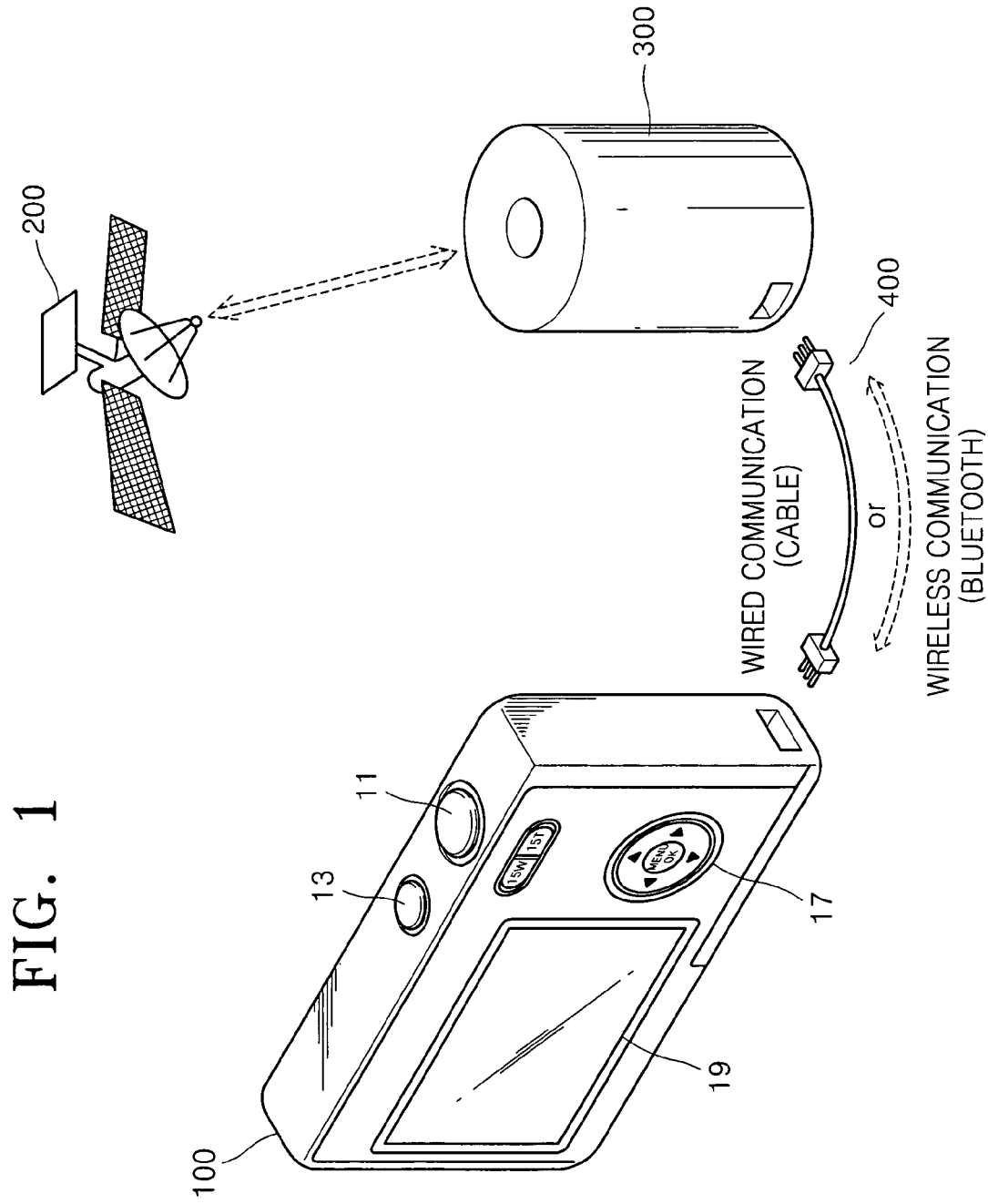
FIG. 1 is a diagram illustrating an example of a configuration of a system for inputting position information into a captured file according to the present invention.

FIG. 1 is a diagram illustrating a configuration of a system for inputting position information into a captured image according to the present invention, the configuration including a digital image processing device 100, a Global Positioning System (GPS) satellite 200, a GPS device 300, and a communication medium 400. In this embodiment, the GPS device 300 may be equipped inside or outside of the digital image processing device 100. However, for convenience of description, this example assumes that the GPS device 300 is equipped outside of the digital image processing unit 100.

The digital image processing device 100 generates an image file by capturing an image and storing the image file includes a shutter-release button 11, a power button 13, a wide angle-zoom button 15W, a telephoto-zoom button 15T, a function button 17, and a display unit 19, as illustrated in FIG. 1. The shutter-release button 11 is open and closed so as to expose a charge coupled device (CCD) or film to light for a predetermined time, and interlocks with a diaphragm (not shown), thereby appropriately exposing an object, and recording an image in the CCD. The power button 13 is pressed in order to supply power to the digital image processing device 100, so as to operate the digital image processing device 100. The wide angle-zoom button 15W or the telephoto-zoom button 15T makes a picture-angle wider or narrower, respectively. In particular, the wide angle-zoom button 15W or the telephoto-zoom button 15T is pressed to change a size of a selected exposed area. When the wide angle-zoom button 15W is pressed, the selected exposed area becomes smaller, and when the telephoto-zoom button 15T is pressed, the selected exposed area becomes larger. The function button 17 includes 5 buttons that are an upper button, a lower button, a left button, a right button, and a menu/OK button. The function button 17 is used to execute several kinds of menu functions relating to operation of the digital image processing device 100, and each of the buttons may be used as a shortcut key.

The GPS satellite 200 is equipped with four extremely accurate clocks having only one second of error per approximately 160,000 years, and based on this, the GPS satellite 200 provides distance information having an error range of less than 30 meters and a timestamp under $10^{-9}$ nano-units, and also provides information pertaining to a three-dimensional position including altitude, longitude, and latitude.

The GPS device 300 receives position information of the GPS device 300 from the GPS satellite 200 at regular time intervals, for example, every 10 seconds, and stores the position information including information on altitude, longitude, latitude, timestamp, speed, and direction. The GPS device 300 receives a radio frequency for measuring a position, which is simultaneously emitted every second from the twenty four GPS satellites 200 orbiting the Earth at an altitude of approximately 20,000 kilometers. A GPS system including the GPS satellite 200 and the GPS device 300 perform a function of displaying position information obtained by using the radio frequency on a digital map, so as to enable a timestamp and a current position (altitude, longitude, latitude, and speed) of the GPS device 300 to be viewed three-dimensionally.

The communication medium 400 connects the digital image processing device 100 with the GPS device 300 by wire, wirelessly, or in any other suitable manner, so as to enable data communication to be performed between the digital image processing device 100 and the GPS device 300. In the case where wired communication is performed, the communication medium 400 may be a cable. In the case where wireless communication is performed, the communication medium 400 may be Bluetooth. Bluetooth provides wireless communication between devices in a short range from each other, without requiring complicated cables. Bluetooth provides wireless data communication between devices in, for example, a short range of 10 meters through 100 meters from each other at a speed of one mega byte per second (Mbps). The devices are of a small size (0.5 square inches), having low power consumption (2.5 mW—Class 2), and Bluetooth modules installed therein.

Figure 2:
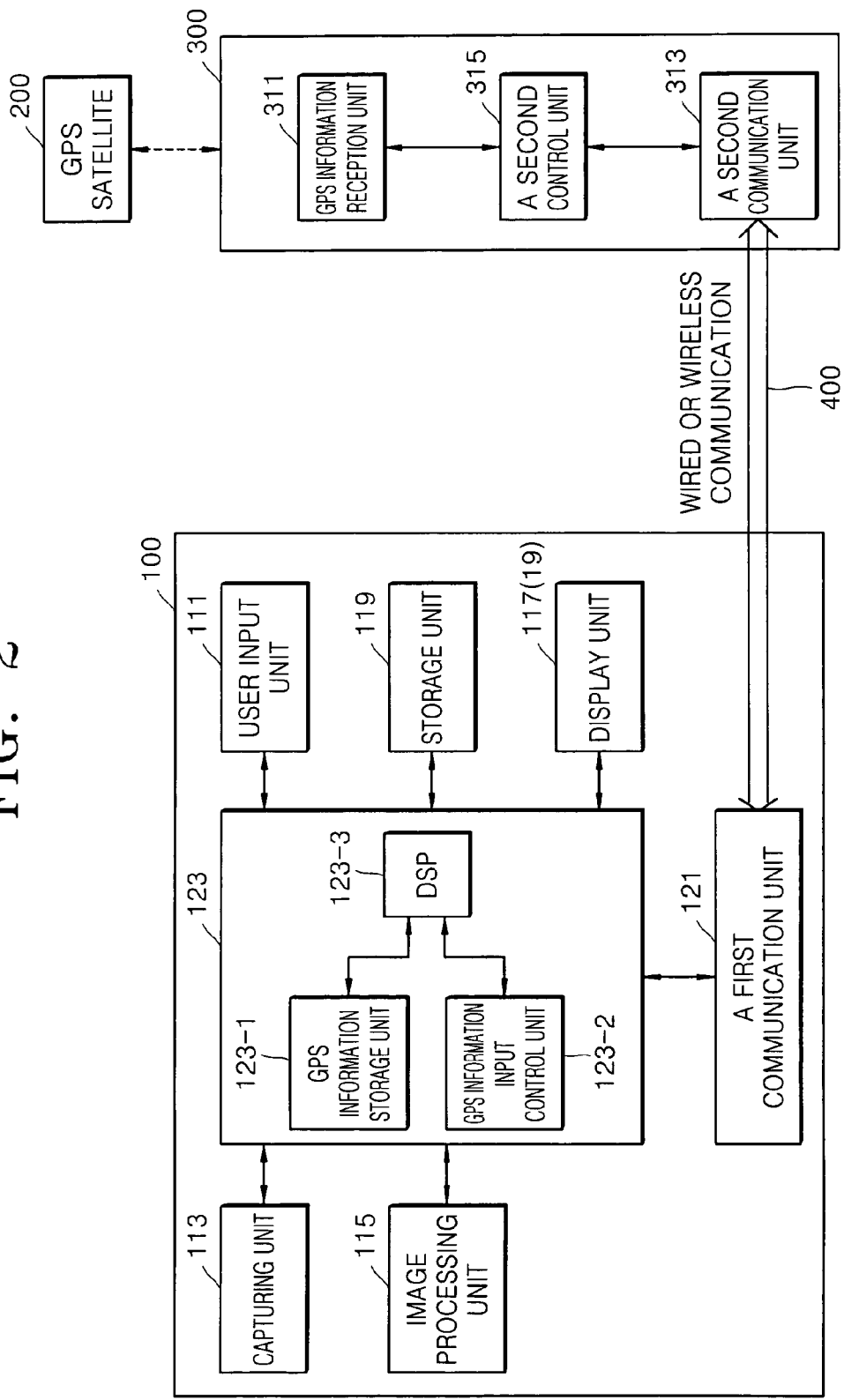
FIG. 2 is a detailed block diagram illustrating an example of a system for inputting position information into a captured file according to an embodiment of the present invention.

In the embodiment of the present invention illustrated in FIG. 2, a digital image processing device 100 stores position information received from a GPS device 300, and then inserts the position information into an image file. In the other embodiment illustrated in FIG. 3, the GPS device 300 stores position information received from a GPS satellite 200, and provides the position information according to a request from the digital image processing device 100.

As illustrated in FIG. 2, the digital image processing device 100 includes a user input unit 111, a capturing unit 113, an image processing unit 115, a display unit 117 (shown as display unit 19 in FIG. 1), a storage unit 119, a first communication unit 121, and a first control unit 123. In this embodiment, the first control unit 123 includes a GPS information storage unit 123-1, a GPS information input control unit 123-2, and a digital signal processor (DSP) 123-3.

Referring to FIGS. 1 and 2, the user input unit 111 includes a shutter-release button 11 that opens and closes, so as to expose a CCD or a film to a light for a predetermined time, a power button 13 turning on/off an operation of the digital image processing device 100, a wide angle-zoom button 15W or a telephoto-zoom button 15T for making a picture-angle wider or narrower according to an input, and a function button 17 that is pressed so as to execute several kinds of menu functions relating to an operation of the digital image processing device 100. The capturing unit 113 includes the shutter-release button 11, a lens unit (not shown), a diaphragm (not shown), a CCD (not shown), and an analog-to-digital converter (ADC) (not shown). The shutter-release button 11 in this example is a device for adjusting the quantity of exposed light, along with the diaphragm. The lens unit receives a light from an external light source and processes an image. At this time, the diaphragm adjusts the quantity of light (hereinafter, light quantity) incident according to the amount the diaphragm is open and closed. The amount the diaphragm is open and closed is controlled by the first control unit 123.

The CCD stores the light quantity input via the lens unit, and according to the stored light quantity, outputs an image captured in the lens unit, synchronizing with a vertical synchronization signal. Image obtainment of the digital image processing device 100 is performed by the CCD converting light reflected from an object into an electrical signal. The ADC converts an analog image signal output from the CCD into a digital signal.

The image processing unit 115 processes the digitally converted image signal by performing signal processing so that the digitally converted image signal can be displayed. A device used for the CCD is sensitive to variations in temperature, and thus can generate dark current according to the varied temperature, causing an undesired black level to be included in an image signal. The image processing unit 115 removes the black level caused by the dark current.

The image processing unit 115 also performs gamma correction. According to Weber's law, a human's angle of view reacts nonlinearly to brightness. Thus, when a limited bit depth is given, if the brightness of a light is linearly recorded, then posterization occurs. Accordingly, in order to show definition as high as possible with the given bit depth, coding has to be performed by using a nonlinear function. In this manner, the gamma correction is for coding information according to the non-linearity of a human's angle of view. The image processing unit 115 performs gamma correction on an image signal input by a gamma curve and then outputs the image signal. For example, the image processing unit 115 corrects an input luminance level of an image signal having twelve bits into a luminance level of an image signal having eight bits, and then outputs the image signal having eight bits.

The image processing unit 115 performs Color Filter Array (CFA) interpolation interpolating a Bayer pattern of gamma corrected predetermined data expressed in an RGRG line and a GBGB line into an RGB line. The CFA interpolation performed in the image processing unit 115 firstly restores a G channel from among pixels only having a value for an R channel or a B channel, and then in an order of B channel and R channel, or R channel and B channel, fills empty values, so as to restore three channels that are R, G, and B channels.

The image processing unit 115 converts the interpolated RGB signal into a YUV signal, and performs edge compensation filtering on a Y signal by a high pass filter so as to clarify a captured image, and performs color correction on color values of U and V signals by using a standard color coordinate system. The image processing unit 115 removes noise of the YUV signal.

The image processing unit 115 compresses the Y, U, and V signals having noise removed and performs signal processing, so as to generate, for example, a Joint Photographic Experts Group (JPEG) file as an image file. The generated JPEG file is displayed on the display unit 117 and stored in the storage unit 119. All operations of the image processing unit 115 are controlled by the DSP 125-3 of the first control unit 125.

The first communication unit 121 controlled by the DSP 125-3 performs wired or wireless data communication via the communication medium 400. The first communication unit 121 controlled by the DSP 125-3 receives position information from the GPS device 300 and stores the position information. In order to input position information, the first control unit 123 includes the GPS information storage unit 123-1, the GPS information input control unit 123-2, and the DSP 123-3. In the present invention, the DSP 123-3 of the first control unit 123 provides various menus for input/non-input of position information, and according to a user's selection, the DSP 123-3 controls the performance of operations related to the input of position information.

The GPS information storage unit 123-1 receives position information from the GPS device 300 via the first communication unit 121 and stores the position information. Here, the position information includes information on altitude, longitude, latitude, timestamp, speed, and direction, as described above. In the present invention, the GPS device 300 updates position information stored in the GPS information storage unit 123-1 at regular time intervals, for example, every 10 seconds. When position information is updated in the GPS information storage unit 123-1, position information previously stored is erased. Also, according to a user's selection, position information in the GPS information storage unit 123-1 may not be updated. In such a case, the position information previously stored is maintained.

The GPS information input control unit 123-2 inputs position information, excluding a timestamp, in a captured image file or an image file stored in the storage unit 119. As described above, according to a user's selection for update/non-update, the updated position information or the previous position information desired by a user is stored in the GPS information storage unit 123-1. Therefore, the GPS information input control unit 123-2 may input the updated position information or the previous position information desired by a user, in an image file. Also, when the digital image processing device 100 stays in a location in which position information has been received, and captures an image but is incapable of receiving position information from the GPS satellite 200 at that location, the GPS information input control unit 123-2 inputs position information excluding a timestamp. Thus, regardless of an amount of time that has elapsed since the image was taken, position information can be input into an image file by the GPS information input control unit 123-2.

Figure 4:
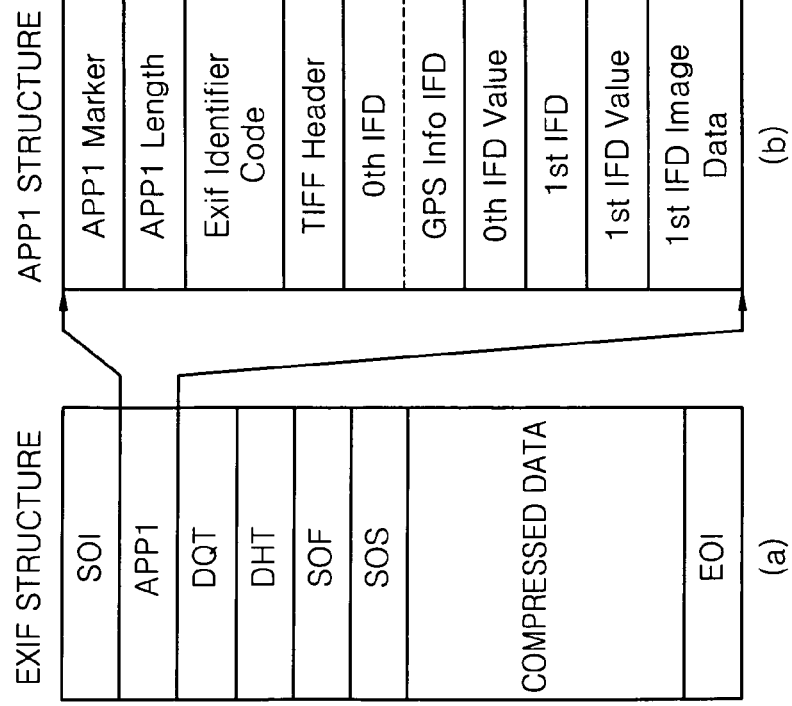
FIGS. 4(a)-(c) are diagrams illustrating an example of an exchangeable image file format (Exif) structure in a Joint Photographic Experts Group (JPEG) file in which position information is recorded.

FIG. 4 is a block diagram illustrating an example of a structure of an exchangeable image file format (Exif) in which position information is recorded. An Exif structure in a JPEG file generated in an image processing unit 115 controlled by a DSP 123-3 is illustrated in the Diagram of FIG. 4(a). In an application marker segment 1 (APP1) area of the Exif structure, additional information such as a capture date of compressed image data, a product name, etc., or thumbnail information is recorded therein. A structure of the APP1 is illustrated in the Diagram of FIG. 4(b). Among the APP1 areas illustrated, there is a GPS info image file directory (IFD) area within a 0th IFD area. The DSP 123-3 stores position information stored in a GPS information storage unit 123-1, in the GPS info IFD area. A structure of the GPS info IFD area is illustrated in the Diagram of FIG. 4(c). The position information stored in the GPS information storage unit 123-1, which is information on a GPS version, latitude, longitude, altitude, speed, timestamp, satellite, or the like, is stored in the GPS info IFD area. In the case where time when an image file is generated, and a timestamp of position information stored in the GPS information storage unit 123-1 are different from each other, the position information excluding the timestamp is stored in the image file.

As further illustrated in FIG. 2, a GPS device 300 includes a GPS information reception unit 311, a second communication unit 313, and a second control unit 315. When power of the GPS device 300 is turned on, the GPS information reception unit 311 controlled by the second control unit 315 receives a timestamp and position information including latitude, longitude, altitude, and direction of the GPS device 300 from the GPS satellite 200 at regular time intervals, for example, every 10 seconds. Then, the GPS information reception unit 311 transmits the timestamp and the position information to a digital image processing device 100 via the second communication unit 313. The second communication unit 313 controlled by the second control unit 315 performs wired or wireless data communication via a communication medium 400.

Next, another embodiment of the present invention illustrated in FIG. 3 will be described.

Figure 3:
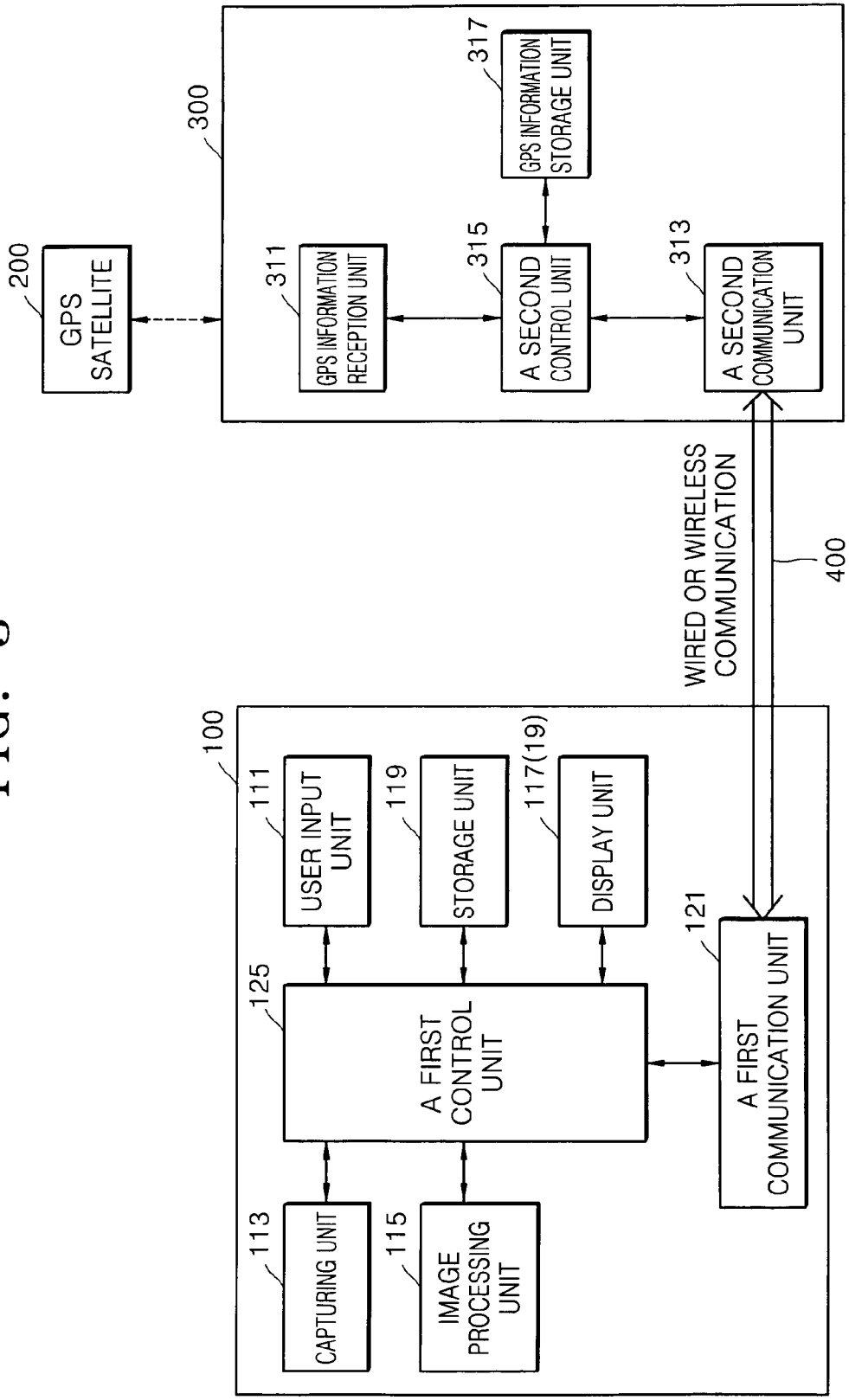
FIG. 3 is a detailed block diagram illustrating an example of a system for inputting position information into a captured file according to another embodiment of the present invention.

As illustrated in FIG. 3, a digital image processing device 100 includes a user input unit 111, a capturing unit 113, an image processing unit 115, a display unit 19 (hereinafter 117), a storage unit 119, a first communication unit 121, and a first control unit 125. In the present invention, all the components included in the digital image processing device 100, except for the first control unit 125, are the same as those illustrated in FIG. 2, therefore detailed descriptions thereof will be omitted here. Also, in this embodiment, the first control unit 125 provides various menus for input/non-input of position information, and according to a user's selection, the first control unit 125 controls the performing of operations related to input of position information.

As illustrated in FIG. 3, a GPS device 300 includes a GPS information reception unit 311, a second communication unit 313, a second control unit 315, and a GPS information storage unit 317. In this embodiment, all the components included in the GPS device 300, except for the GPS information storage unit 317, are the same as those illustrated in FIG. 2, therefore detailed descriptions thereof will be omitted here.

In the embodiment illustrated in FIG. 2, position information that is GPS information, is stored in a first control unit 123 of the digital image processing unit 100. However, in the other embodiment illustrated in FIG. 3, position information that is GPS information, is stored in the GPS device 300. The GPS information storage unit 317 receives position information from a GPS satellite 200 via the GPS information reception unit 311, and stores the position information. Here, the position information includes information on altitude, longitude, latitude, timestamp, speed, and direction, as described above.

The second control unit 315 updates position information stored in the GPS information storage unit 317 at regular time intervals for example, every 10 seconds. When position information is updated in the GPS information storage unit 317, position information previously stored is erased. Also, according to a user's selection, the position information in the GPS information storage unit 317 may be not updated. In such a case, the position information previously stored is maintained.

Since position information is stored in the GPS device 300, in order to input position information in an image file, the digital image processing device 100 has to request the GPS device 300 for position information. The first control unit 125 requests the GPS device 300 for position information, receives the position information, and inputs position information excluding a timestamp in a captured image file or an image file stored in the storage unit 119.

Here, as described above, according to a user's selection for update/non-update, updated position information or previous position information desired by a user is stored in the GPS information storage unit 317 of the GPS device 300. Thus, according to a request, the first control unit 125 may input the updated position information or the previous position information desired by a user, in an image file. Also, in the case where the digital image processing device 100 stays in a location in which position information has been received, and captures an image but is incapable of receiving position information from the GPS satellite 200, the first control unit 125 inputs position information excluding a timestamp, according to a request. Thus, regardless of an amount of time that has elapsed since an image was taken, position information can be input into an image file by the first control unit 125.

Next, referring to FIGS. 5 and 6, examples of operations for inputting position information into a captured image will be described in detail.

Figure 5:
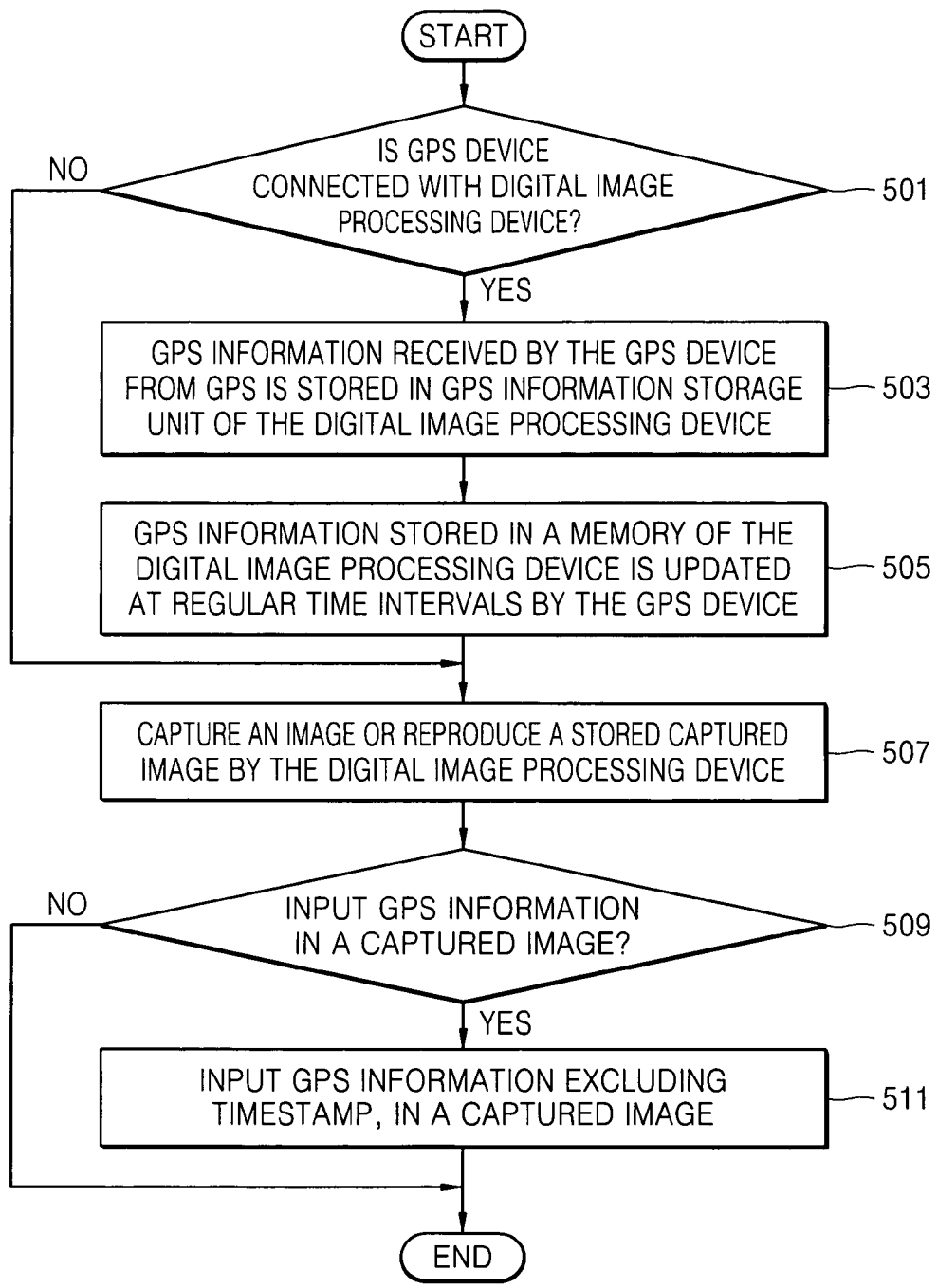
FIG. 5 is a flowchart illustrating an example of operations that can be performed by a method for inputting position information into a captured file, according to an embodiment of the present invention.

According to an embodiment of the present invention illustrated in FIG. 5, operations for inputting position information into a captured image may be performed inside of a digital image processing device 100, as illustrated in FIG. 2. A main algorithm for inputting position information into a captured image may be performed inside of a first control unit 123, while being supported by peripheral components within the digital image processing device 100.

In operation 501, the digital image processing device 100 confirms whether a GPS device 300 is connected. When a communication medium 400 is connected between the digital image processing device 100 and the GPS device 300, the first control unit 123 senses a connection via a first communication unit 121.

In operation 503, when the GPS device 300 is connected with the digital image processing device 100 via the communication medium 400, position information (hereinafter, GPS information) received by the GPS device 300 from a GPS satellite 200 is stored in a GPS information storage unit 123-1 of the digital image processing device 100. The GPS information to be stored in the GPS information storage unit 123-1 includes information on latitude, longitude, altitude, timestamp, speed, and direction, as described above.

In operation 505, the GPS device 300 updates GPS information received from the GPS satellite 200, which is then stored in the GPS information storage unit 123-1 of the digital image processing device 100, at regular time intervals, for example, every 10 seconds. When new GPS information is updated in the GPS information storage unit 123-1, previously stored GPS information is erased. Also, according to a user's selection, GPS information may be not updated in the GPS information storage unit 123-1. In such a case, the previously stored GPS information is maintained.

In operation 507, the digital image processing device 100 generates an image file by capturing an image, or reproduces an image file stored in a storage unit 119. In operation 509, a DSP 123-3 determines whether to input GPS information into an image file. For this purpose, the DSP 123-3 provides various menus for input/non-input of GPS information, and according to a menu selected by a user, the DSP 123-3 controls performing operations related to the input of GPS information.

In operation 511, in order to input GPS information into an image file, a GPS information input control unit 123-2 inputs GPS information excluding a timestamp, into an image file. As described above, according to a user's selection for update/non-update, updated GPS information, or previous GPS information desired by a user is stored in the GPS information storage unit 123-1. Thus, the GPS information input control unit 123-2 may input the updated GPS information or the previous GPS information desired by users, into an image file. Also, in the case where the digital image processing device 100 stays in a location in which position information has been received, and captures an image but is incapable of receiving position information from the GPS satellite 200, the GPS information input control unit 123-2 inputs GPS information excluding a timestamp. Thus, regardless of an amount of time that has elapsed since an image was taken, GPS information can be input into an image file by the GPS information input control unit 123-2.

Figure 6:
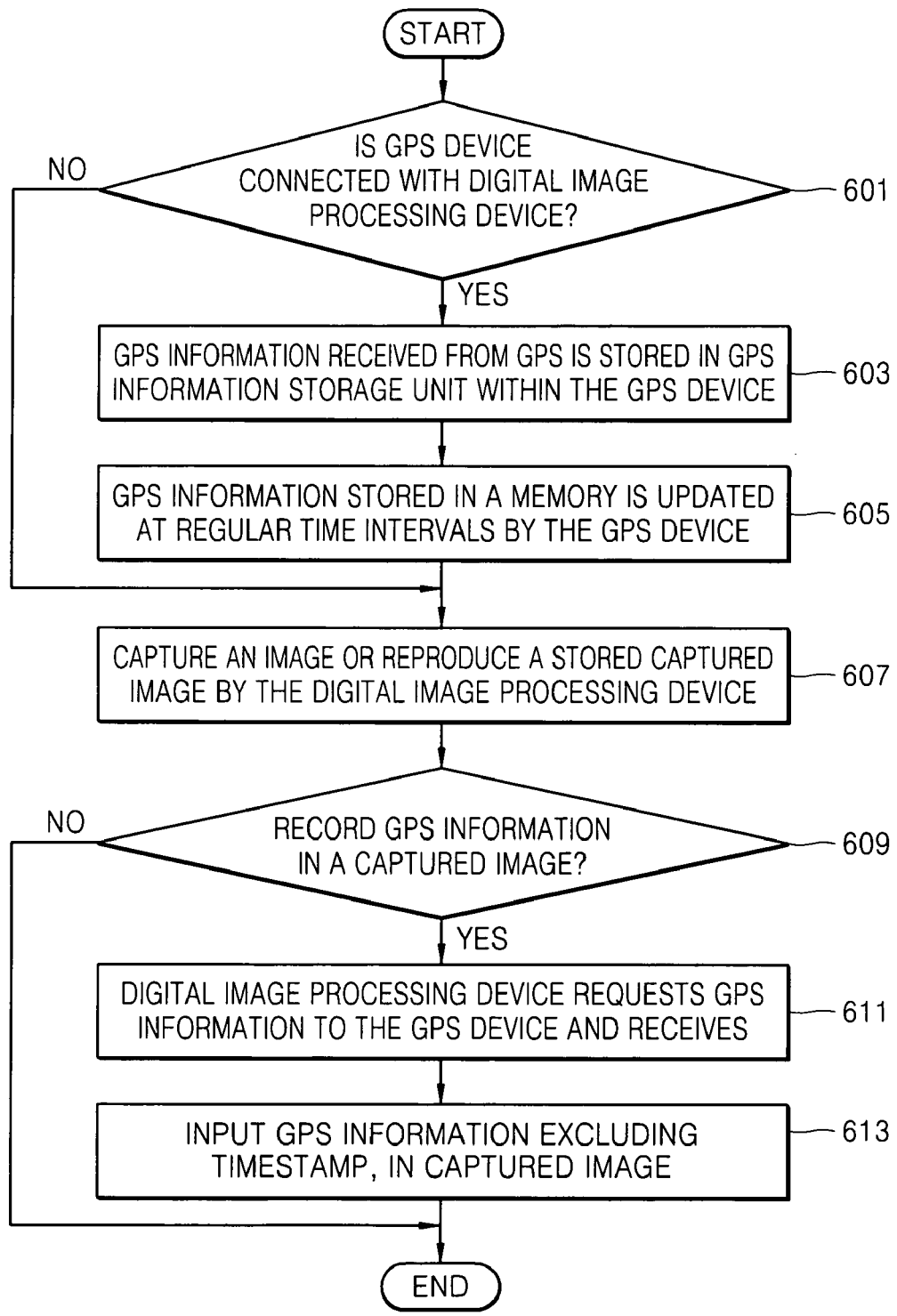
FIG. 6 is a flowchart illustrating an example of operations that can be performed by method for inputting position information into a captured file, according to another embodiment of the present invention.

Next, an operation method of a system for inputting GPS information into a captured image, according to another embodiment of the present invention as illustrated in FIG. 6, will be described.

According to an embodiment of the present invention illustrated in FIG. 6, operations for inputting position information into a captured image may be performed inside of a digital image processing device 100, as illustrated in FIG. 3. According to embodiments, a main algorithm for inputting position information into a captured image may be performed inside of a first control unit 125, while being supported by peripheral components within the digital image processing device 100.

In operation 601, a digital image processing device 100 confirms whether a GPS device 300 is connected. When a communication medium 400 is connected between the digital image processing device 100 and the GPS device 300, a first control unit 125 senses a connection via a first communication unit 121.

In operation 603, when the GPS device 300 is connected with the digital image processing device 100 via the communication medium 400, GPS information received by the GPS device 300 from a GPS satellite 200 is stored in a GPS information storage unit 317 which is within the GPS device 300. The GPS information to be stored in the GPS information storage unit 317 includes information on latitude, longitude, altitude, timestamp, speed, and direction, as described above.

In operation 605, the GPS device 300 updates GPS information received from the GPS satellite 200 and stored in the GPS information storage unit 317, at regular time intervals, for example, every 10 seconds. When new GPS information is updated in the GPS information storage unit 317, previously stored GPS information is erased. Also, according to a user's selection, GPS information may not be updated in the GPS information storage unit 317. In such a case, the previously stored GPS information is maintained.

In operation 607, the digital image processing device 100 generates an image file by capturing an image, or reproduces an image file stored in a storage unit 119. In operation 609, the first control unit 125 determines whether to input GPS information into an image file. For this purpose, the first control unit 125 provides various menus for input/non-input of GPS information, and according to a menu selected by users, the first control unit 125 controls the performing of operations related to the input of GPS information.

In operation 611, in order to input GPS information into an image file, the first control unit 125 requests the GPS device 300 for GPS information via the communication medium 400, and receives the GPS information. According to a request by the first control unit 125, a second control unit 315 of the GPS device 300 transmits GPS information stored in the GPS information storage unit 317 to the digital image processing device 100 via the communication medium (400). Then, n operation 613, a GPS information input control unit 123-2 inputs GPS information excluding a timestamp, into an image file.

As described above, according to a user's selection for update/non-update, updated GPS information, or previous GPS information desired by users is stored in the GPS information storage unit 317 of the GPS device 300. Thus, when requested, the first control unit 125 may input the updated GPS information or the previous GPS information desired by users, in an image file. Also, in the case where the digital image processing device 100 stays in a location in which GPS information has been received, and captures an image but is incapable of receiving GPS information from the GPS satellite 200, the first control unit 125 inputs GPS information excluding a timestamp, according to a request. Thus, regardless of an amount of time that has elapsed since an image was taken, GPS information can be input into an image file by the first control unit 125.

Another embodiment of the present invention is described below, in relation to FIG. 2. A digital image processing device 100 updates GPS information stored in a GPS information storage unit 123-1 at regular time intervals. However, in the case where a user does not want to update GPS information, if a 'GPS information update menu' (not shown) from among various menus provided by a DSP 123-3 is not activated, an updating operation is stopped.

For example, when a user moves from a point A to a point B, generally, GPS information stored in the GPS information storage unit 123-1 is updated from GPS information on point A to GPS information on point B. However, a user currently being in point B may input GPS information on point A into an image file. In such a case, the user does not activate 'GPS information update menu'. By doing so, an updating operation of the GPS information storage unit 123-1 is stopped, thereby enabling the GPS information storage unit 123-1 to maintain the GPS information on point A so that the user can input the GPS information on point A into an image file.

Also, GPS information stored in the GPS information storage unit 123-1 can be deleted when power of the digital image processing device 100 is turned off. Later, when power of the digital image processing device 100 is turned on by users, the users may want to check final GPS information. The user may remember the final GPS information. However, if the user does not remember the final GPS information, then the user has to reproduce and check every captured image file one by one, so as to check the final GPS information. Therefore, although power of the digital image processing device 100 is turned off, when a 'GPS information storage menu' (not shown) capable of maintaining the final GPS information stored in the GPS information storage unit 123-1 is activated, then the users may easily check the final GPS information. After 'GPS information storage menu' is activated, it is assumed that power of the digital image processing device 100 is turned off and is then turned on again. After that, when a user activates a 'view stored GPS information menu' (not shown), GPS information stored in the GPS information storage unit 123-1 is displayed on a display unit 117 with various display methods such as a map, a direction, or a text, so as to enable the user to easily check the final GPS information.

As can be appreciated from above, according to the embodiments of the present invention, a digital image processing device can store, in real-time, position information excluding a timestamp received from a GPS device, and whenever requested, record the position information in a captured or reproduced image. Also, the GPS device can store, in real-time, position information received from a GPS, and when requested by the digital image processing device, transmit the position information so as to be recorded in a captured image. By doing so, regardless of an amount of time that has elapsed since the image was taken, position information can be input into an image file so that user conveniences are maximized.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A system for inputting position information into a captured image, the system comprising:
    a digital image processing device for generating an image file by capturing an image and storing the image file; and
    a global positioning system (GPS) device for receiving position information from a GPS satellite at regular time intervals;
    a GPS information storage unit for receiving position information from the GPS device and for promptless storing of the position information; and
    a control unit for saving position information, into the image file;
wherein:
    the global positioning system (GPS) device receives position information with the timestamp from the GPS satellite at regular time intervals;
    the GPS information storage unit receives the position information with the timestamp from the GPS device and promptlessly stores of the position information with the timestamp; and
    the control unit saves position information of the received position information from the GPS information storage unit into the image file if a time when the image file is generated is different from the timestamp of position information stored in the GPS information storage unit.

2. The system of claim 1, wherein the GPS device updates position information stored in the GPS information storage unit at regular time intervals.

3. The system of claim 2, wherein when position information stored in the GPS information storage unit is updated, previously stored position information is erased.

4. The system of claim 1, wherein when connected with the GPS device, the digital image processing device comprises the GPS information storage unit and the control unit.

5. The system of claim 4, wherein the GPS device updates position information stored in the GPS information storage unit at regular time intervals.

6. The system of claim 5, wherein when position information stored in the GPS information storage unit is updated, previously stored position information is erased.

7. The system of claim 4, wherein if power of the digital image processing device is turned off, final position information stored in the GPS information storage unit can be maintained.

8. The system of claim 7, further comprising a display unit for displaying the final stored position information maintained in the GPS information storage unit when the power is turned on.

9. The system of claim 1, wherein:
    the GPS device comprises the GPS information storage unit; and
    the digital image processing device requests the GPS device for position information, receives the position information, promptlessly stores the position information, and includes the control unit which inputs position information excluding a timestamp, into the image file.

10. The system of claim 9, wherein the GPS device updates position information stored in the GPS information storage unit at regular time intervals.

11. The system of claim 10, wherein when position information stored in the GPS information storage unit is updated, previously stored position information is erased.

12. The system of claim 1, wherein:
    the digital image processing device displays the position information.

13. The system of claim 1, wherein the control unit can input the position information from the GPS information storage unit excluding the timestamp into the image file if the digital image processing device is in a state incapable of receiving position information from the GPS satellite.

14. The system of claim 1, wherein if the GPS device does not update position information, the control unit can input into the image file the position information that is previously stored in the GPS information storage unit and excludes the timestamp.

15. The system of claim 14, wherein the GPS device not-updated position information is stored in the GPS information storage unit according to a user's selection.

16. the system of claim 1, wherein the control unit saves the position information excluding a timestamp into the image file.

17. A method for operating a system to input position information into a captured image, wherein the system comprises a digital image processing device for generating an image file by capturing an image and storing an image file and a global positioning system (GPS) device for receiving position information from a GPS satellite at regular time intervals, the method comprising:
    (a) determining whether the digital image processing device is connected to the GPS device;
    (b) when the digital image processing device is connected to the GPS device, operating the digital image processing device to receive and promptlessly store position information from the GPS device; and
    (c) operating the digital image processing device to save position information into the image file;
wherein:
    in step (b), the digital image processing device receives and promptlessly stores position information with the timestamp from the GPS device when the digital image processing device is connected to the GPS device; and in step (c), the digital image processing device inputs the promptlessly stored position information of the received position information into the image file if a time when the image file is generated is different from the timestamp that the position information is stored.

18. The method of claim 17, wherein in step (b), the GPS device updates position information stored in the digital image processing device at regular time intervals.

19. The method of claim 18, wherein when position information stored in the digital image processing device is updated, previously stored position information is erased.

20. The method of claim 17, further comprising:
operating the digital image processing device to store the position information received from the GPS device and input the stored position information excluding the timestamp into the image file.

21. The method of claim 20, wherein in step (b), the GPS device updates position information stored in the digital image processing device at regular time intervals.

22. The method of claim 21, wherein when position information stored in the digital image processing device is updated, previously stored position information is erased.

23. The method of claim 17, wherein:
the GPS device stores the position information; and
in step (c) the digital image processing device requests to receive the position information from the GPS device, and inputs the received position information excluding a timestamp into the image file.

24. The method of claim 17, wherein in step (b), the GPS device updates position information stored in the GPS device at regular time intervals.

25. The method of claim 24, wherein when position information stored in the GPS device is updated, previously stored position information is erased.

26. The method of claim 17, further comprising:
operating the digital image processing device to display the position information.

27. The method of claim 17, wherein in step (c) the digital image processing device inputs the promptlessly stored position information excluding the timestamp into the image file if the digital image processing device is in a state incapable of receiving position information from the GPS satellite.

28. The method of claim 17, wherein in step (c), when the GPS device non-updates, the digital image processing device inputs into the image file the position information that is previously stored and excludes the timestamp.

29. The method of claim 27, wherein in step (c), when the GPS device non-updates according to a user's selection, the digital image processing device inputs into the image file the position information that is previously stored and excludes the timestamp.

30. The method of claim 17, further comprising (d) operating the digital image processing device to maintain the final stored position information when power of the digital image processing device is turned off.

31. The method of claim 30, further comprising (e) displaying the final stored position information when power of the digital image processing device is turned off and is then turned on again.

32. The system of claim 17, wherein step (c), the digital image processing device saves the position information excluding a timestamp into the image file.

* * * * *